US009110489B2

(12) United States Patent
    Svorc

(10) Patent No.: US 9,110,489 B2
(45) Date of Patent: Aug. 18, 2015

(54) LOSS-LESS COIL CURRENT ESTIMATOR FOR PEAK CURRENT MODE CONTROL SMPS

(71) Applicant: Dialog Semiconductor GmbH, Kirchheim/Teck-Nabern (DE)

(72) Inventor: Jindrich Svorc, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 182 days.

(21) Appl. No.: 13/790,364

(22) Filed: Mar. 8, 2013

(65) Prior Publication Data

US 2014/0247026 A1    Sep. 4, 2014

(30) Foreign Application Priority Data

Mar. 4, 2013  (EP) ..................................... 13368007

(51) Int. Cl.
    *G05F 1/00*      (2006.01)
    *G05F 1/625*     (2006.01)
    *H02M 3/156*     (2006.01)
    *H02M 1/00*      (2007.01)

(52) U.S. Cl.
    CPC .............. *G05F 1/625* (2013.01); *H02M 3/156* (2013.01); *H02M 2001/0009* (2013.01)

(58) Field of Classification Search
    USPC .................. 323/266, 271, 274, 280, 284, 288
    See application file for complete search history.

(56) References Cited

U.S. PATENT DOCUMENTS

| 5,654,677 | A |   | 8/1997  | Dent |
| 5,990,670 | A | * | 11/1999 | Derks ........................... 323/282 |
| 6,377,032 | B1 | * | 4/2002  | Andruzzi et al. ............. 323/224 |
| 7,768,245 | B1 | * | 8/2010  | De Cremoux ................ 323/259 |
| 2003/0141856 | A1 | * | 7/2003  | Kimura ......................... 323/282 |
| 2005/0179423 | A1 |   | 8/2005  | Xing |
| 2006/0061343 | A1 | * | 3/2006  | Lipcsei et al. ................ 323/283 |
| 2008/0258701 | A1 | * | 10/2008 | Liu et al. ....................... 323/328 |
| 2010/0327836 | A1 |   | 12/2010 | Li et al. |
| 2011/0316508 | A1 | * | 12/2011 | Cheng et al. .................. 323/282 |
| 2012/0078556 | A1 |   | 3/2012  | Holmberg et al. |
| 2012/0139519 | A1 |   | 6/2012  | Dearborn |

OTHER PUBLICATIONS

European Search Report 13368007.4-1804 Mailed: Jan. 8, 2014.

* cited by examiner

*Primary Examiner* — Adolf Berhane
*Assistant Examiner* — Gary Nash
(74) *Attorney, Agent, or Firm* — Saile Ackerman LLC; Stephen B. Ackerman

(57) ABSTRACT

The present disclosure relates to a high efficiency switched mode power supply (SMPS) having increased efficiency due to loss-less coil current estimation for current control. A circuit in the control unit of SMPS comprises a capacitor and the voltage on the capacitor is an integral of the current flowing into the cap over time and if there are current sources which depend on the input and the output voltage, periodically switched with the same signals as the P and N switches, the voltage on the charged capacitor has the same shape as the current through the coil. The signal gleaned from the capacitor voltage are used the same manner by the control unit as it was with the signals from prior art current sensing.

27 Claims, 5 Drawing Sheets

LOSS-LESS COIL CURRENT ESTIMATOR FOR PEAK CURRENT MODE CONTROL SMPS

TECHNICAL FIELD

The present document relates to Switching Mode Power Supplies (SMPS). In particular, the present document relates to sensing of coil current of a SMPS circuit.

BACKGROUND

Sensing of coil current is very important for operating and controlling SMPS circuits. Information about the current through the coil of the circuit is absolutely required that a control circuit can react accordingly to keep the coil current at level which provides correct output voltage Power consuming current sensing should be avoided, the current sensing circuits should be not complex and should not require significant area. Furthermore quiescent current should be reduced as far as any possible and noise immunity, which is especially important for switching mode power supplies, has to be minimized.

SUMMARY OF THE DISCLOSURE

A principal object of the present disclosure is to omit a power consuming current sensing circuit in a switched mode power supply (SMPS) . . . .

A further object of the disclosure is to improve overall efficiency of the SMPS by reducing the quiescent current.

A further object of the disclosure is to improve noise immunity of the whole SMPS system.

A further object of the disclosure is to add an internal controller signal estimating the actual coil current.

A further object of the disclosure is to generate a large coil current signal which means lower demands on comparators.

In accordance with the objects of this disclosure a method to improve efficiency of a switched mode power supply (SMPS) system has been achieved. The method comprises the steps of: providing a switched mode power supply system comprising a first and a second switch, a coil and a control circuit comprising a capacitor, removing a current sensing circuitry, and estimating actual coil current without loss of power.

In accordance with the objects of this disclosure a switched mode power supply (SMPS) system having enhanced efficiency by replacing current sensing circuitry by a lossless current estimation circuitry deployed in a control unit of the SMPS has been achieved. The SMPS disclosed firstly comprises: a coil, a port for an input voltage, and a port for an output voltage. Furthermore the SMPS comprises a first switching means activating charging of the coil wherein the first switch is controlled by the control block, a second switching means activating discharging of the coil wherein the second switch is controlled by the control block, and a control block to control the SMPS system comprising a coil current estimation circuit wherein the estimation circuit uses both values of the input voltage and output voltage of the SMPS system to estimate the current through the coil.

SHORT DESCRIPTION OF THE FIGURES

The invention is explained below in an exemplary manner with reference to the accompanying drawings, wherein FIG. 1 illustrates basic components of a buck switching mode power supply current mode control circuit.

FIG. 7 shows simulation results; and.

DETAILED DESCRIPTION

Methods and circuits to enhance the overall efficiency of current mode control SMPS circuits are disclosed. The method and circuit disclosed are applicable to all kinds of Switching Mode Power Supplies (SMPS) where current mode control is adequate; this includes buck, boost, and buck-boost converters.

Figure 1:
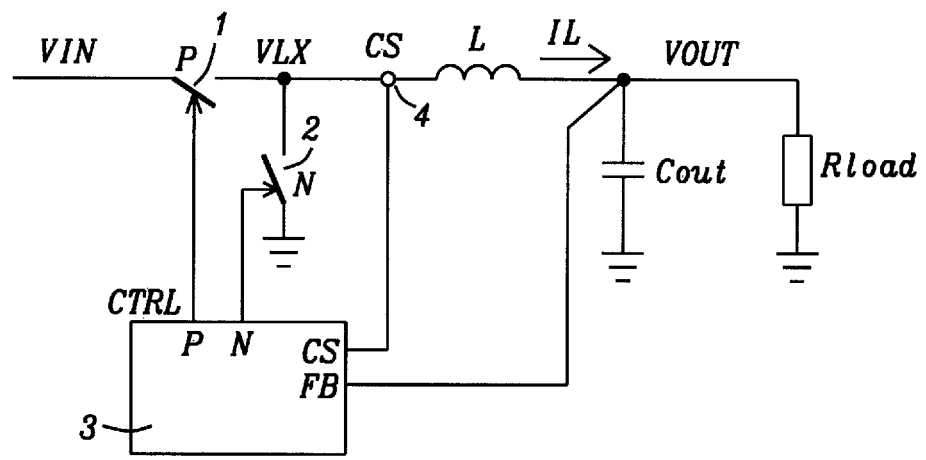

FIG. 1 illustrates shows e.g. a buck Switching Mode Power Supply (SMPS) current mode (CM) topology. The circuit consist of power stage created by switches P 1 and N 2, output filter L+Cout, Load resistor Rload, controller CTRL 3 with voltage feed-back input FB and current sensing circuit CS 4. The current sensing circuit CS is essential for whole operation of the SMPS since it provides information about the actual current IL through the coil L so the control circuit 3 can react accordingly to keep the coil current IL at level which provides correct output voltage at node VOUT.

This solution has few drawbacks.

Current sensing circuit is quite complex piece of design often implemented directly in the pass-device.

The current sensing precision is usually not perfect so additional trimming has to be added.

Current sensing circuit has to be much faster than the switching frequency of the SMPS so the speed of the circuit is vital for correct operation. It usually brings higher power consumption and such design loses efficiency at light load.

Current sensing circuit is connected directly or very close to the VLX node which is the noisiest node in the circuit caused by switches P and N. It brings further issues with switching noise susceptibility of whole system.

Figure 2:
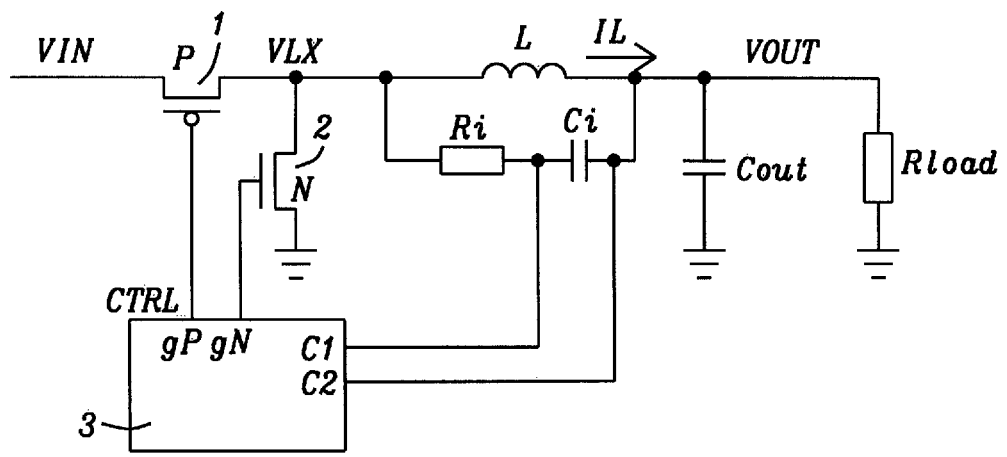
FIG. 2 illustrates a current mode control circuit with integrator.

Another solution of the current control sensing circuit is shown in FIG. 2, illustrating a current mode control circuit with integrator. This circuit is not measuring current directly but estimating the coil current in line with coil current IL and voltage relation.

$$i_L(t) = \frac{1}{L} \int v_L(t) dt \quad (1)$$

This simply means that if the voltage across the inductor is integrated over time the actual current flowing through the coil will result. The circuit of FIG. 2 solves this by an adding integrator realized by resistor Ri and capacitor Ci in parallel to the inductor L. Both ends of the capacitor Ci are fed to the control circuit and the control circuit reacts in line with the information provided by the output of the integrator. The constant term 1/L is omitted from this calculation since the controller usually uses different signal voltage level anyway.

The solution of the circuit shown in FIG. 2 has advantages over the circuit of FIG. 1 but still has some drawbacks:

Additional components Ri and Ci are required which are not negligible from area point of view Additional losses through Ri and Ci components.

Switching noise can go through the Ri into the control circuit.

Figure 3:
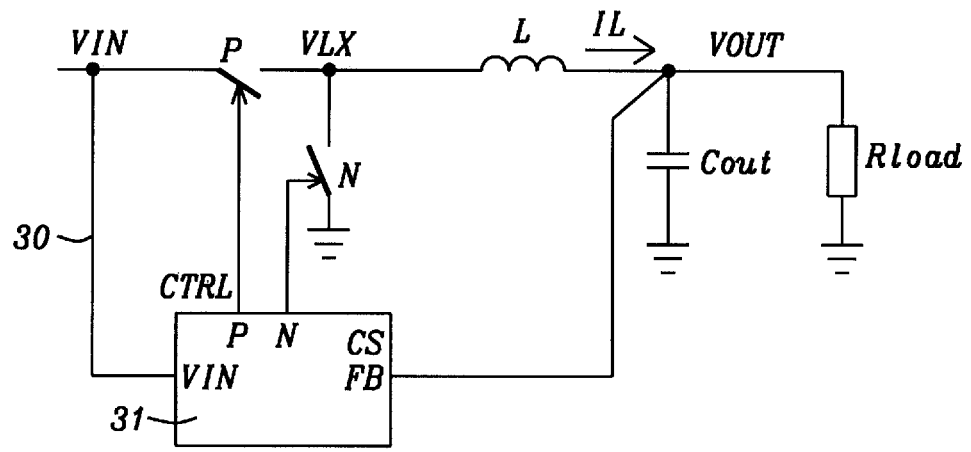
FIG. 3 illustrates a simplified block schematic of a preferred embodiment of a buck switching mode power supply current mode control circuit of the disclosure.

FIG. 3 illustrates a simplified block schematic of a preferred embodiment of the disclosure. The circuit of FIG. 3 has two significant differences compared to the circuit shown in FIG. 1:

First, the current sensing circuit CS 4 has been completely removed. Secondly, a connection 30 to input voltage VIN has to be noted. This connection 30 might not be necessary drawn here because it has to be there anyway for powering the circuit, but it is important for explanation. Looking at FIG. 3, it is obvious that there is no direct coil current IL measurement so it has to be estimated in the control block 31.

Figure 4:
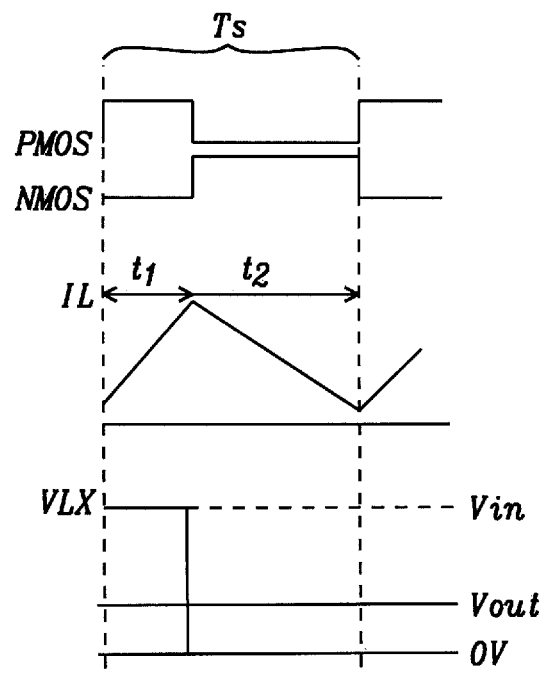
FIG. 4 shows typical waveforms of a buck SMPS.

FIG. 4 shows typical waveforms of a buck SMPS. Typical current IL and voltage VLX curves in buck SMPS circuits are shown. The coil L is charged from VIN within $t_1$ period and discharged to output voltage VOUT during $t_2$ time period. PMOS and NMOS signals correspond to P and N switches in Error! Reference source not found. respectively. If the signal is high the switch is ON.

Next section describes how to get a signal with the same shape as the current IL through the coil L. The same equation (1) for estimating the coil current as before is used.

$$i_L(t) = \frac{1}{L}\int v_L(t)dt \quad (1)$$

As outlined before the important operator in this equation is the integral. We assume the inductance of coil L to be constant; hence the part 1/L is constant as well. Next part of the equation is the voltage applied to the coil L. For further calculation we assume that input voltage VIN and output voltage VOUT do not vary in a time interval. We can rewrite the equation for time interval t1:

$$i_{L t1}(t) = \frac{1}{L}(Vin - Vout)\cdot t, \quad (2)$$

and for time interval t2:

$$i_{L t1}(t) = -\frac{1}{L}Vout \cdot t \quad (3)$$

These equations describe the triangle shape wave of the coil current IL shown in FIG. 4. The voltages Vin and Vout are taken from the input and from the voltage feed-back node so no additional pin is necessary.

For simple estimation of the current in the control circuit we need a factor is required providing the same functionality as described above. A capacitor provides a good solution, wherein a basic equation describes a capacitor voltage over time:

$$v_C(t) = \frac{1}{C}\int i_C(t)dt \quad (4)$$

Figure 5:
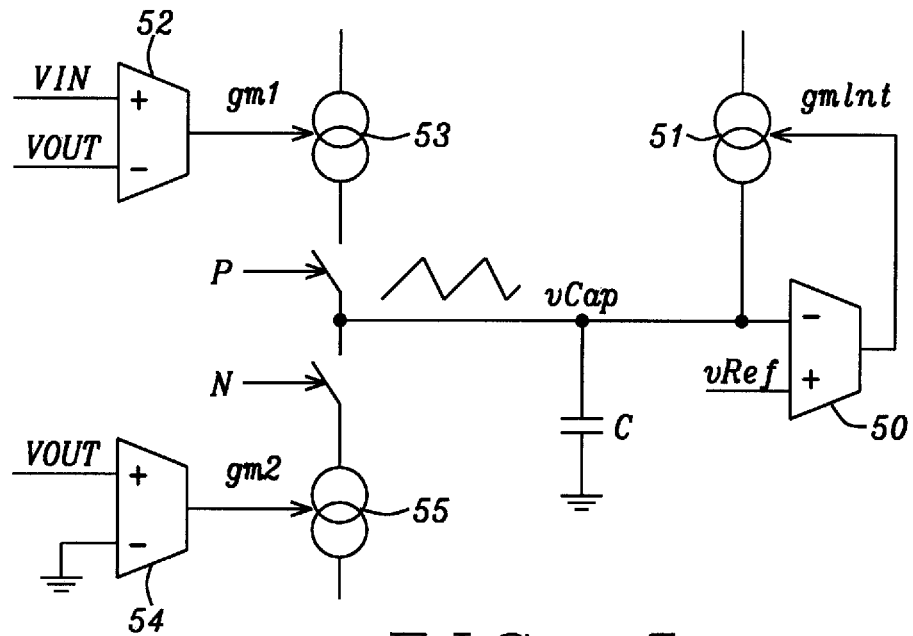
FIG. 5 depicts the core structure of a current estimator.

The equation (4) above describes that the voltage across the capacitor is an integral of the current flowing into the capacitor over time. It means if there are current sources which depend on the input and the output voltage, periodically switched with the same signals as the P and N switches, the voltage on the charged capacitor has, according to equation (4), the same shape as the current through the coil L The core structure of the circuit is shown in FIG. 5. It should be noted that gm1 is transconductance of the amplifier 50 and the current source 51 together. The same applies for gm2 signifying the common transconductance of the amplifier 54 and current source 55 and gmInt signifying the common transconductance of the amplifier 50 and current source 51

Current source 53 is a dependent current source where the output current is derived from the difference between VIN and VOUT. This current source is connected via node vCap to the capacitor C if the P switch is on. It should be noted that in a preferred embodiment of the disclosure the "P" switches shown in FIGS. 3, 5 and 6 are PMOS switches and correspondently the "N" switches are all shown in FIGS. 3, 5 and 6 are NMOS switches.

It should be noted that while typically PMOS is used for switches close to input voltage and NMOS is used for switches close to the ground it is alternatively also be possible to use NMOS for the P switch and PMOS for the N switch It is the same period time as when the coil L is connected between VIN and VOUT as shown in FIG. 3. The other current source 55 is connected in the other period when the N switch is on and it depends on the output voltage VOUT, because at this time the coil L, shown in FIG. 3, is connected between the ground and VOUT. The gain of gm1 and gm2 must be equal and well balanced. The node vCap is also connected to a differential amplifier 50 which compares the voltage on the capacitor C with the reference voltage vRef and controls the current source 51 with overall trans-conductance gmInt.

Figure 6:
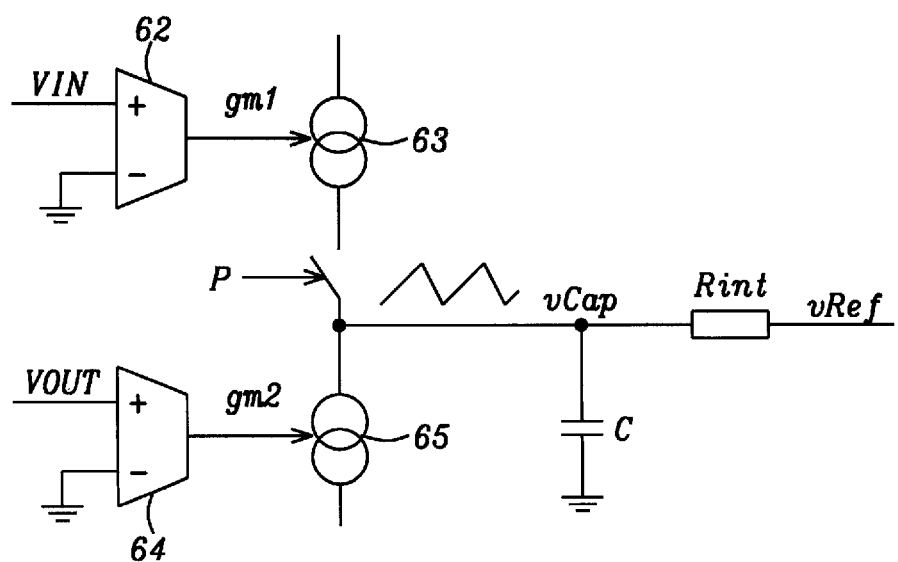
FIG. 6 shows an alternative structure of the circuit.

Another possible arrangement of the circuit is shown in FIG. 6. In this case the top current source 63 is not controlled with the difference of the input and output voltage but with the full input voltage. Current source 65 does not have any switch in its path. The capacitor is charged when the P switch is turned on with current $$i_{Cr1}(t) = gm \cdot (Vin(t) - Vout(t)),$$

wherein $$gm = gm_1 = gm_2$$

It should be noted the transconductance gm is designer's choice and can vary in quite wide ranges. The absolute value of the transconductance depends on the affordable voltage swing at the vCap node.

The top terminal of current source 63 may be connected to the supply which powers the controller and the lower terminal of current source 65 may be connected to ground. But since we are using ideal current sources in these schematics with infinite impedance the connection is not important for the functionality point of view.

The function of both circuits described above estimates nicely the current in the coil but it would not work for a long time. The main reason are misbehavior of different parts in the circuit, like mismatch in timing, mismatch between current sources, saturation of the coil, loses in the coil, different voltage across the coil and so on.

In order to put the system back to the right position a simple feedback is necessary as shown for example in FIG. 5. This is done by the differential amplifier 50 which compares the voltage on the capacitor C with a reference voltage Vref and controls the current source 51 with overall trans-conductance gmInt. The time constant of this feedback must be precisely chosen because it has to be much slower than the time constant of gm1×C but it has to be fast enough to cover all non-ideal behaviors in the circuit.

The transconductance gmint should be much lower than transconductance gm. But it must be able to cope with non-ideality of the circuit which moves the vCap up or down (because of bad timing, saturation of the coil, etc.) It's a trade-off.

An alternative solution is shown in the right part of Error! Reference source not found. A simple resistor Rint is placed between the reference voltage Vref and vCap node which again pushes the vCap node closer towards vRef.

The slow feedback or the RC filter C/Rint brings one pole in to the overall transfer function so it is not necessary to create another pole in the compensation network of the overall voltage loop.

Furthermore it should be noted the signal at node vCap, as shown in FIGS. 5 and 6, is further processed in the control unit CTRL the same way as in prior art the signal from the current sensing circuit.

It should be noted that any of the feedback arrangements shown in FIG. 5 or 6 could be applied to any kind of Switching Mode Power Supplies (SMPS) where current mode control is adequate.

Moreover it should be noted the current estimator circuits, as shown in FIGS. 5 and 6, can also be used to detect transition from a normal operation, i.e. synchronized (synch) mode, to sleep mode, i.e. when no current is flowing anymore.

Figure 7:
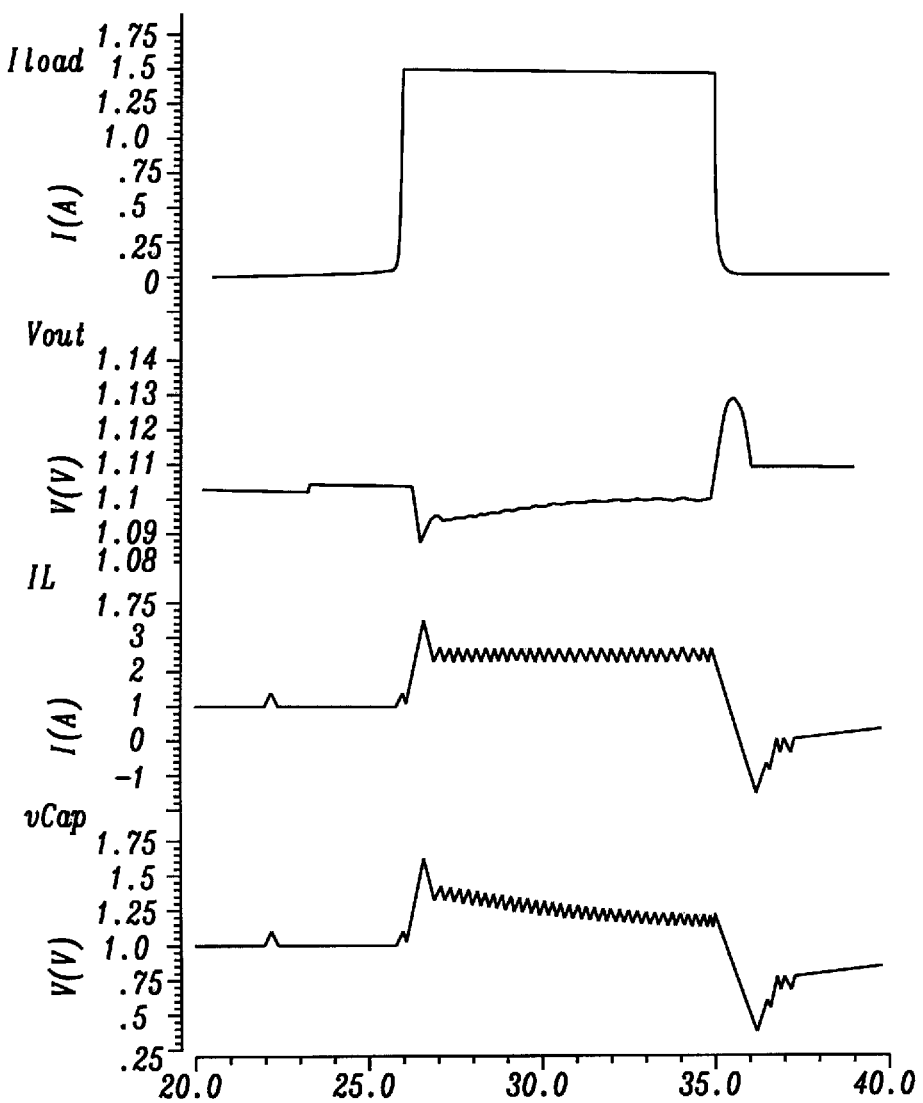

The simulation results of whole buck are shown in FIG. 7. A load pulse is applied at the output of the buck converter. Load current and corresponding output voltage are shown in the first two rows. The third row shows the real current in the coil and the last row shows the corresponding voltage on capacitor C—node vCap in FIG. 5. The impact of the gmInt during the transient is obvious.

Figure 8:
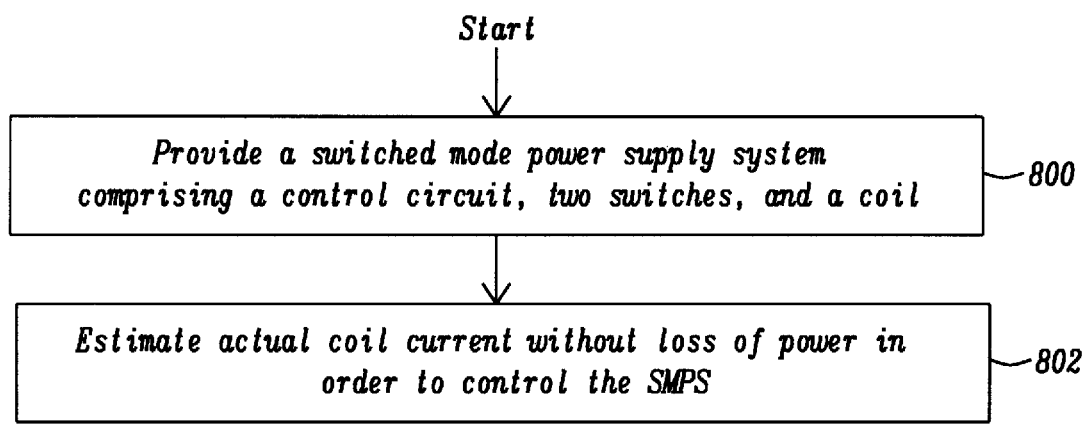
FIG. 8 shows a flowchart of a method to improve efficiency of a switched mode power supply (SMPS) system.

FIG. 8 shows a flowchart of a method to improve efficiency of a switched mode power supply (SMPS) system. A first step 800 depicts a provision of a switched mode power supply system comprising a control circuit, two switches, and a coil. The next step 801 shows estimating actual coil current without loss of power in order to control the SMPS.

While the invention has been particularly shown and described with reference to the preferred embodiments thereof, it will be understood by those skilled in the art that various changes in form and details may be made without departing from the spirit and scope of the invention.

What is claimed is:

1. A method to improve efficiency of a switched mode power supply (SMPS) system, the method comprising the steps of:
    (1) providing a switched mode power supply system comprising a first and a second switch, a coil, wherein the coil is charged from an input voltage of the SMPS system while the first switch is closed during a first period and the coil is discharged to an output voltage while the second switch is closed during a second period, and a control circuit comprising a capacitor and a first and a second current source, wherein the second current source is depending on the output voltage and the first current source is periodically switched with a same signal as the first switch; and
    (2) estimating actual coil current without loss of power in order to control the SMPS;
    wherein a voltage across the capacitor has a same shape as the current through the coil and the estimation of the coil current is performed based on an equation:

$$v_C(t) = \frac{1}{C}\int i_C(t)dt, ,,$$

wherein $v_c$ is the voltage across the capacitor, C is a capacitance of the capacitor and $i_c$ is a charging/discharging current of the capacitor.

2. The method of claim 1, wherein the estimation of the coil current is performed in the control circuit and a result is indicated by a signal provided by the control circuit.

3. The method of claim 1, wherein the same shape of the voltage across the capacitor is achieved by the first current source depending on a difference between the input voltage and the output voltage and the second current source, wherein both current sources are periodically switched with the same signals as the first and second switches.

4. The method of claim 1, wherein the same shape of the voltage across the capacitor is achieved by the first current source depending on the input voltage and the second current source, wherein the first current source is periodically switched with the same signal as the first switch in order to charge the capacitor and wherein a terminal of the capacitor, which is connected the second current source and via a switch to the first current source is connected additionally via a resistor to a reference voltage.

5. The method of claim 1, wherein the same shape of the voltage across the capacitor is achieved by the first current source depending on the input voltage and the second current source depending on the output voltage, wherein the first current source is periodically switched with the same signal as the first switch in order to charge the capacitor and wherein a terminal of the capacitor, which is connected the second current source and via a switch to the first current source is connected additionally to a differential amplifier which is comparing the voltage across the capacitor with a reference voltage and an output of the differential amplifier controls a current source with overall transconductance gmint.

6. The method of claim 1, wherein the estimation of the coil current can be used to detect a transition from a synchronized mode of the SMPS to sleep mode and a signal indicating sleep mode is triggered subsequently.

7. The method of claim 1, wherein the SMPS system is a buck converter.

8. The method of claim 1, wherein the SMPS system is a boost converter.

9. The method of claim 1, wherein the SMPS system is a buck-boost converter.

10. A switched mode power supply (SMPS) system having enhanced efficiency by replacing current sensing circuitry by a lossless current estimation circuitry deployed in a control block of the SMPS, wherein the SMPS system comprises
    a coil;
    a port for an input voltage;
    a port for an output voltage;
    a first switching means activating charging of the coil wherein the first switch is controlled by the control block;
    a second switching means activating discharging of the coil wherein the second switch is controlled by the control block;

a first current source, wherein the first current source is periodically switched with a same signal as the first switching means;
a second current source, wherein the second current source is depending on the output voltage;
the control block to control the SMPS system comprising a coil current estimation circuit wherein the estimation circuit uses both values of the input voltage and output voltage of the SMPS system to estimate the current through the coil.

11. The SMPS of claim 10, wherein the current estimation circuit is used to detect a transition from a synchronized mode of the SMPS system to a sleep mode of the SMPS system.

12. The SMPS of claim 10, wherein the estimation of the coil current can be used to detect a transition from a synchronized mode of the SMPS to sleep mode and a signal indicating sleep mode is triggered subsequently.

13. The SMPS of claim 10 wherein the SMPS is a buck converter.

14. The SMPS of claim 10 wherein the SMPS is a boost converter.

15. The SMPS of claim 10 wherein the SMPS is a buck-boost converter.

16. The SMPS of claim 10, wherein the estimation circuit comprises:
a first differential amplifier having inputs and an output, wherein a first input is the input voltage of the SMPS system, a second input is the output voltage of the SMPS voltage, and the output is controlling the first current source
said first current source wherein the current generated is derived from a difference between the input voltage of the SMPS system and the output voltage of the SMPS system and wherein the first current source is connected to a capacitor when a third switching means is ON;
said third switching means switching with a same period as the first switching means;
a second differential amplifier having inputs and an output, wherein a first input is the output voltage of the SMPS system, a second input is connected to ground voltage, and the output is controlling the second current source
said second current source wherein the current generated is derived from a difference between the output voltage of the SMPS system and ground and the second current source is connected to the capacitor when a fourth switching means is ON;
said fourth switching means switching with a same period as the second switching means;
said capacitor connected with a first terminal to said third and fourth switching means and to a feedback means and connected with a second terminal to ground; and
said feedback means to stabilize the current estimation circuit.

17. The SMPS of claim 16, wherein the feedback means comprises:
a third differential amplifier having inputs and an output, wherein a first input is connected to the first terminal of the capacitor and to an output of a third current source and a second input is a reference voltage, and the output is controlling the third current source; and
said third current source wherein the current generated is derived from a difference between the voltage at the first terminal of the capacitor and the reference voltage and wherein the current generated is connected to the first terminal of the capacitor.

18. The SMPS of claim 16, wherein the feedback means comprises a resistor connected between the first terminal of the capacitor and a port of the reference voltage.

19. The SMPS of claim 16, wherein said third switching means is a PMOS switch.

20. The SMPS of claim 16, wherein said fourth switching means is a NMOS switch.

21. The SMPS of claim 10 wherein said first switching means is a PMOS switch.

22. The SMPS of claim 10 wherein said second switching means is a NMOS switch.

23. The SMPS of claim 10, wherein the estimation circuit comprises:
a first differential amplifier having inputs and an output, wherein a first input is the input voltage of the SMPS system, a second input is a reference voltage, and the output is controlling a first current source
said first current source wherein the current generated is derived from a difference between the input voltage of the SMPS system and the reference voltage and wherein the first current source is connected to a capacitor when a third switching means is ON;
said third switching means switching with a same period as the first switching means;
a second differential amplifier having inputs and an output, wherein a first input is the output voltage of the SMPS system, a second input is connected to ground voltage, and the output is controlling a second current source
said second current source wherein the current generated is derived from a difference between the output voltage of the SMPS system and ground and the second current source is connected to the capacitor;
said capacitor connected with a first terminal to said third switching means and to a feedback means and connected with a second terminal to ground; and
said feedback means to stabilize the current estimation circuit.

24. The SMPS of claim 23, wherein the feedback means comprises:
a third differential amplifier having inputs and an output, wherein a first input is connected to the first terminal of the capacitor and to an output of a third current source and a second input is a reference voltage, and the output is controlling the third current source; and
said third current source, wherein the current generated is derived from a difference between the voltage at the first terminal of the capacitor and the reference voltage and wherein the current generated is connected to the first terminal of the capacitor.

25. The SMPS of claim 23, wherein the feedback means comprises a resistor connected between the first terminal of the capacitor and a port of the reference voltage.

26. The SMPS of claim 23, wherein said third switching means is a PMOS switch.

27. The SMPS of claim 23, wherein said fourth switching means is a NMOS switch.

* * * * *